(12) United States Patent
Sato et al.

(10) Patent No.: US 8,824,858 B2
(45) Date of Patent: Sep. 2, 2014

(54) INFORMATION PROCESSING APPARATUS AND INFORMATION PROCESSING METHOD

(75) Inventors: Masahiko Sato, Tokyo (JP); Sho Murakoshi, Tokyo (JP)

(73) Assignee: Sony Corporation, Tokyo (JP)

( * ) Notice: Subject to any disclaimer, the term of this patent is extended or adjusted under 35 U.S.C. 154(b) by 624 days.

(21) Appl. No.: 12/799,838

(22) Filed: Apr. 29, 2010

(65) Prior Publication Data

US 2010/0296794 A1 Nov. 25, 2010

(30) Foreign Application Priority Data

May 20, 2009 (JP) ................................ P2009-121727

(51) Int. Cl.
*H04N 5/775* (2006.01)
*H04N 5/782* (2006.01)

(52) U.S. Cl.
CPC ............. *H04N 5/7755* (2013.01); *H04N 5/782* (2013.01)
USPC ........................................................ 386/250

(58) Field of Classification Search
CPC ............ H04N 21/4825; H04N 21/454; H04N 21/44222; H04N 5/7755
See application file for complete search history.

(56) References Cited

U.S. PATENT DOCUMENTS

| 5,907,836 A * | 5/1999 | Sumita et al. ................ 707/754 |
| 7,209,631 B2 * | 4/2007 | Tada et al. .................... 386/241 |
| 7,743,161 B2 * | 6/2010 | Dey et al. ..................... 709/231 |
| 7,764,862 B2 * | 7/2010 | Takao ........................... 386/241 |

FOREIGN PATENT DOCUMENTS

JP 2004-260847 A 9/2004

* cited by examiner

*Primary Examiner* — Huy T Nguyen
(74) *Attorney, Agent, or Firm* — Sony Corporation

(57) ABSTRACT

An information processing apparatus is provided, which includes: a parameter setting section for setting a parameter of a delimitation detecting method with respect to a service that receives content by an operation of an input device; and a delimitation detecting section for detecting delimitation of the received content by the set parameter.

18 Claims, 6 Drawing Sheets

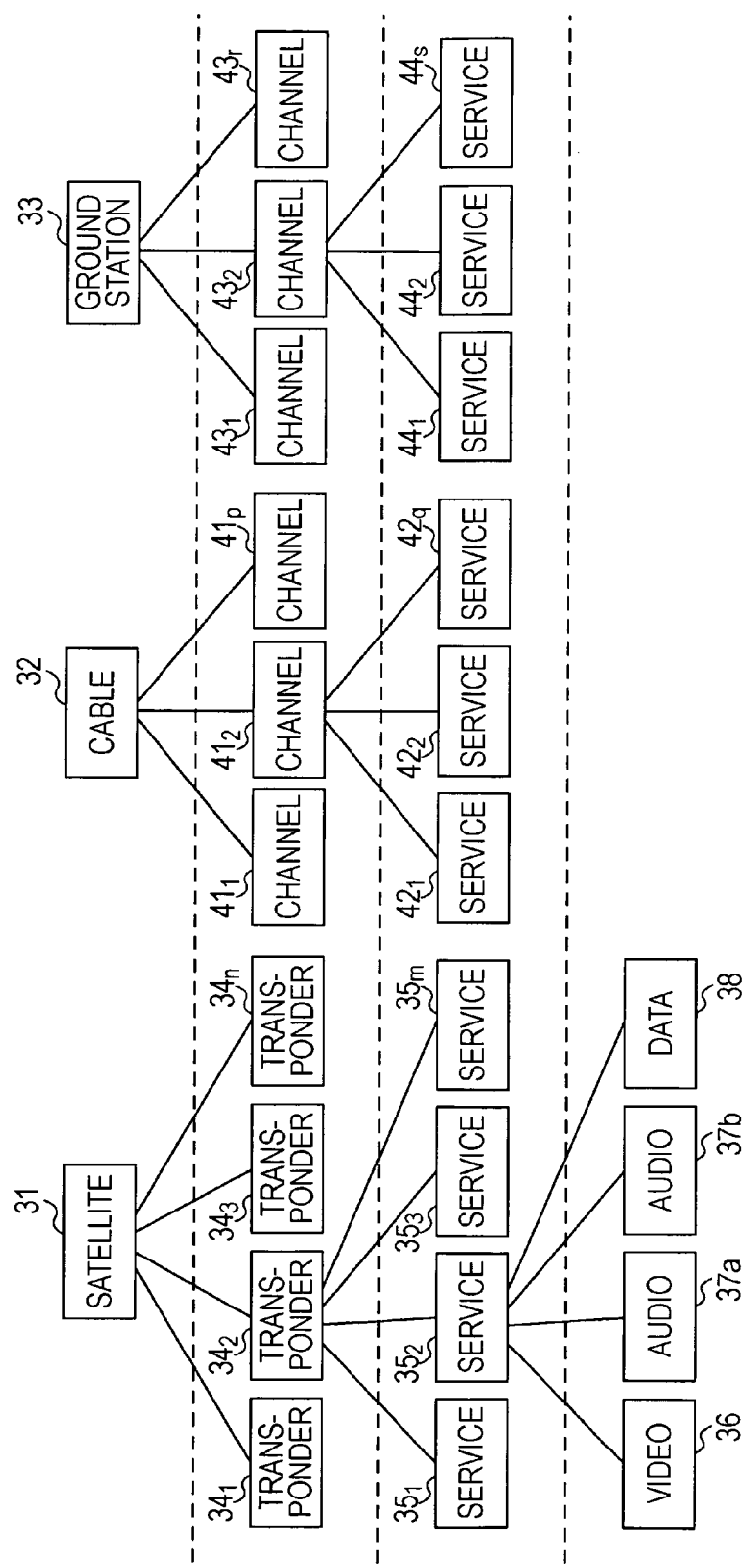

FIG. 4A 

FIG. 4B 

FIG. 4C 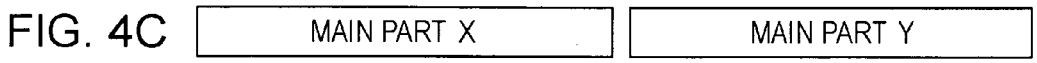

FIG. 5

| | USAGE IN SCENE DETECTION | DIFFERENCE WITH REGION AND SERVICE |
|---|---|---|
| CAPTION | FOREIGN LANGUAGE TRANSLATION CAPTION DOES NOT EXIST IN CM | IN THE NETHERLANDS CAPTION IS GIVEN TO NATIONAL LANGUAGE, AND IN GERMANY VOICE OF GERMAN LANGUAGE IS GIVEN (NO CAPTION) |
| VIDEO PATTERN | ANALYZE SCENE BY DETECTING CUT, AND DETERMINE WHEN CUT FOR A GIVEN PERIOD OF TIME IS CONTINUOUS TO BE CM | IN PUBLIC BROADCAST CM DOES NOT EXIST, OR CM FOR A LONG PERIOD OF TIME IS INSERTED OUTSIDE MAIN PART, AND IN PRIVATE BROADCAST CM FOR A SHORT PERIOD OF TIME IS INSERTED INTO PROGRAM |
| VOICE PATTERN | ANALYZE SCENE BY DETECTING CUT, AND DETERMINE WHEN CUT FOR A GIVEN PERIOD OF TIME IS CONTINUOUS TO BE CM | IN PUBLIC BROADCAST CM DOES NOT EXIST, OR CM FOR A LONG PERIOD OF TIME IS INSERTED OUTSIDE MAIN PART, AND IN PRIVATE BROADCAST CM FOR A SHORT PERIOD OF TIME IS INSERTED INTO PROGRAM |

INFORMATION PROCESSING APPARATUS AND INFORMATION PROCESSING METHOD

CROSS-REFERENCE TO RELATED APPLICATION

The present application claims priority from Japanese Patent Application No. JP 2009-121727 filed in the Japanese Patent Office on May 20, 2009, the entire content of which is incorporated herein by reference.

BACKGROUND OF THE INVENTION

1. Field of the Invention

The present invention relates to an information processing apparatus and an information processing method which are applied to receive, for example, digital television broadcasting, and record content of the received program.

2. Description of the Related Art

There have been known information processing apparatuses, connected to a receiving device of digital television broadcasting, that record content (video information and/or audio information) of a received program on a recording medium such as a hard disk. The information processing apparatuses of the related art have a function for automatically delimiting the program by chapter by perceiving the change of a motion picture and a voice during the recording of the received program. Information indicating delimitation of the chapter is referred to as a chapter mark. Similarly to the content, the chapter mark is recorded on the recording medium.

The chapter mark is generated by a scene detection algorithm. The scene detection algorithm detects a commercial (hereinafter, referred to as a CM (Commercial message)), detects a stereo voice in a silent state, and detects switching of sound of a boundary and the like of a music and a conversation, or switching of video having a great scene change. Delimitation of the chapter is, for example, delimitation of a program main part and a CM, a start point and an end point of an interval of program advertising within the program main part, and a start point or an end point of an interval of program opening or program ending, and the like. When a change of video is represented, a change of video (switching of a scene) having the shortest time is referred to as a cut, a collection of a plurality of cuts is referred to as a scene, and a collection of one or plural scenes is referred to as a chapter. In an actual device, the number of creatable chapters is ordinarily limited. In the present specification, delimitation of the chapter and delimitation of the scene are collectively referred to as delimitation.

It is possible for a user to reproduce only the user's favorite chapter by selecting a chapter which is automatically set. When a hard disk is used as a recording medium, it is possible to reproduce a prerecorded part without waiting for recording to end while continuing recording of a program. Such a reproducing method is referred to as follow-up reproduction. Even at the time of follow-up reproduction, it is preferable to be capable of reproducing a favorite chapter by using the chapter mark. A function for assigning a chapter during recording is necessary to realize the follow-up reproduction.

Japanese Unexamined Patent Application Publication No. 2004-260847 discloses the configuration in which the switching time of a scene is stored, focused on video of multimedia data, and when the interval is a multiple of 15 seconds during switching of the past several scenes, the time interval is determined to be a commercial. When the turn of a scene (cut) is 15 seconds, 30 seconds, and 1 minute (a multiple of 15 seconds), it is determine to be a CM.

SUMMARY OF THE INVENTION

In Europe, it is possible to receive a large number of services reaching up to 1000 from one broadcasting satellite, for example, AstralG. It is also possible for a broadcasting station to watch broadcasting of other countries (Europe broadcasting such as Spain, Italy and France, America, Middle East, and South America) in addition to one's own country (for example, Germany). As described above, when a large variety of broadcasts from many countries are capable of being received, the feature is significantly different by a country of sending-out origination of broadcasting, or a type of a broadcasting station (state management or private management). Therefore, when the CM detecting method disclosed in Japanese Unexamined Patent Application Publication No. 2004-260847 is applied in all cases, there may occur a problem that chapter detection with a high degree of accuracy is not able to be performed.

Therefore, it is desirable to provide an information processing apparatus and an information processing method capable of performing delimitation detection with a high degree of accuracy.

According to an embodiment of the present invention, there is provided an information processing apparatus including: a parameter setting means for setting a parameter of a delimitation detecting method with respect to a service that receives content by an operation of an input device; and a delimitation detecting means for detecting delimitation of the received content by the set parameter.

An information processing apparatus according to another embodiment of the present invention includes: a service specifying means for specifying a service that receives content; a parameter setting means for setting a parameter of a delimitation detecting method with respect to the service specified by the service specifying means; and a delimitation detecting means for detecting delimitation of the received content by the set parameter.

According to an embodiment of the present invention, there is provided an information processing method including the steps of: setting a parameter of a delimitation detecting method with respect to a service that receives content by an operation of an input device; and detecting delimitation of the received content by the set parameter.

An information processing method according to another embodiment of the present invention including the steps of: specifying a service that receives content; setting a parameter of a delimitation detecting method with respect to the service specified by the service specifying step; and detecting delimitation of the received content by the set parameter.

According to the embodiments of the present invention, it is possible to detect delimitation by parameters optimal for the services to be received, and to improve accuracy of delimitation detection.

BRIEF DESCRIPTION OF THE DRAWINGS

FIG. 3 is a schematic diagram used for describing digital satellite broadcasting to which the first embodiment of the invention is applied.

FIGS. 4A to 4C are schematic diagrams illustrating a plurality of examples of insertion forms of CM.

FIG. 5 is a table for describing methods of utilization in scene detection of a caption, a video pattern, and a voice pattern, and differences with regions and services.

DESCRIPTION OF THE PREFERRED EMBODIMENTS

Hereinafter, the embodiments of the invention will be described. Meanwhile, the descriptions will be made in the following order.

1. First Embodiment
2. Second Embodiment
3. Modified Example

The embodiments described below are preferred specific examples of the present invention, and defined by a variety of preferable technical limitations. However, the scope of the present invention is not intended to be limited to embodiments such as those in the description below unless particularly stated that the present invention is limited thereto.

1. First Embodiment

An Example of an Information Processing Apparatus

As an example of an information processing apparatus, a recording and reproducing device is envisaged which is capable of receiving digital broadcasting, recording a received program on a recording medium, for example, a hard disk, and reproducing the program from the hard disk. The recording and reproducing device receives digital broadcasting signals in which transmission channel coding is performed in an MPEG (Moving Picture Experts Group)-2 format transport stream, and records a desired program from the received digital broadcasting signal in the recording medium. The recording and reproducing device is a device for reproducing the desired program from programs recorded in the recording medium by the MPEG-2 format. In this example, although the MPEG-2 format is used as a compressed and coded format of a video signal and an audio signal, the compressed and coded format is not limited to, in particular, the MPEG-2 format.

Figure 1:
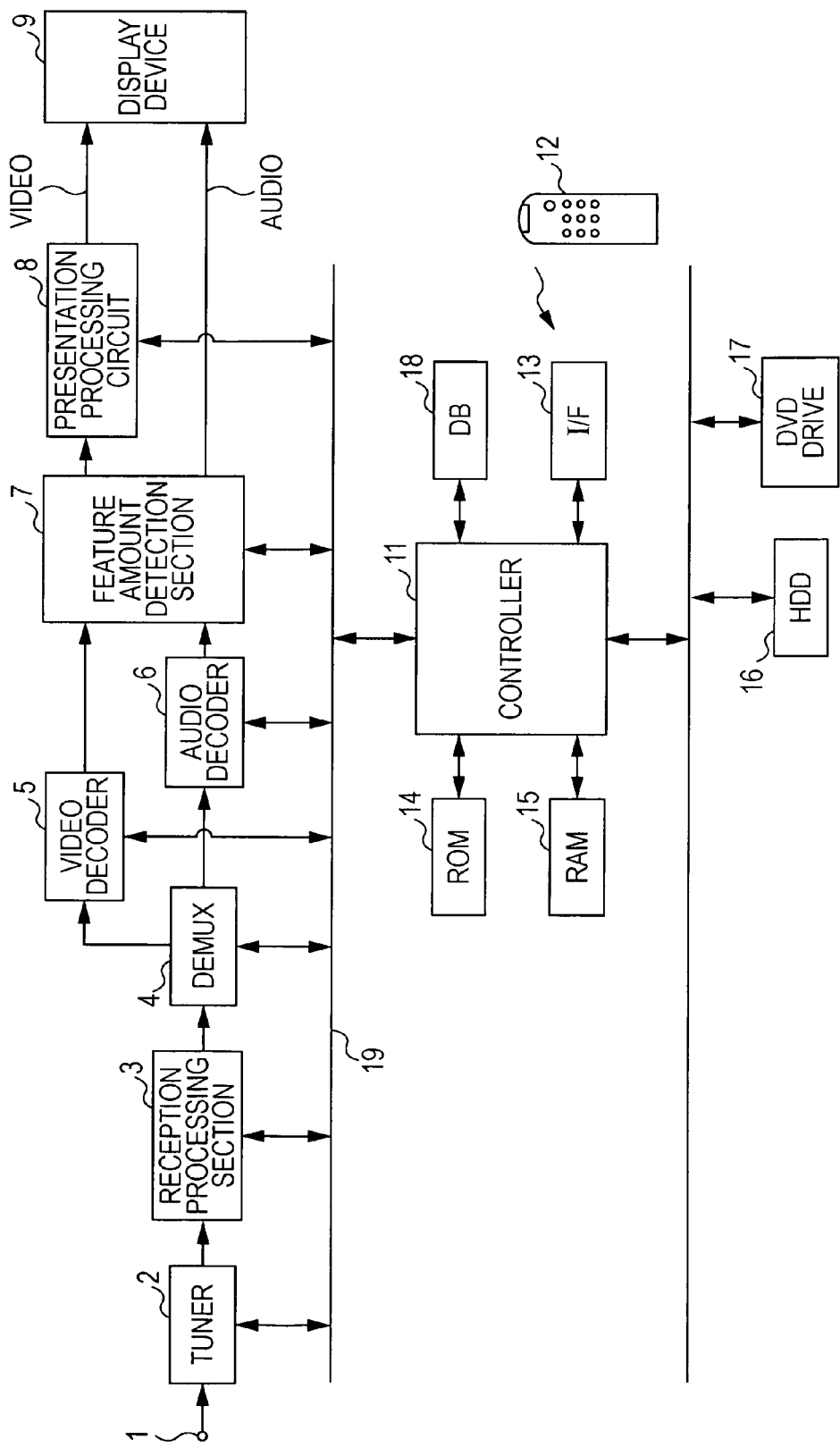
FIG. 1 is a block diagram illustrating the configuration of an information processing apparatus according to a first embodiment of the invention.

FIG. 1 is a block diagram illustrating a hardware configuration example of a recording and reproducing device used as an information processing apparatus according to the first embodiment. In FIG. 1, a system controller 11 is a microcomputer composed of, for example, a CPU (Central Processing Unit) and the like. A ROM (Read Only Memory) 14, a RAM (Random Access Memory) 15 and a database 18 are connected to the system controller 11. The database 18 is stored in a nonvolatile memory. The system controller 11 executes programs stored in the ROM 14, to thereby control each part of the recording and reproducing device collectively. Data used for performing chapter assignment accurately are stored in the database 18, as described later.

Operation input information of a user is supplied to the system controller 11 by an input device such as a remote commander 12 or operation buttons via a user input interface 13. The system controller 11 discriminates the input operation input information, and executes a process in response to the operation input information.

A signal processing section including a tuner 2, a reception processing section 3, a demultiplexer (DEMUX) 4, a video decoder 5, an audio decoder 6, a feature amount detection section 7 and a presentation processing circuit 8 is connected to a bus 19 extended from the system controller 11. Each component of the signal processing section is controlled by a control signal from the system controller 11, and content data are input and output between a portion of the components and the system controller 11.

An output of the antenna, not shown, is supplied from an input terminal 1 to the tuner 2. An output signal of the tuner 2 is supplied to the reception processing section 3. The tuner 2 performs tuning and detection of services (channels). The reception processing section 3 demodulates a signal supplied from the tuner 2, and decodes an MPEG-2 format transport stream (hereinafter, simply referred to as stream), and performs descrambling when the decoded stream is scrambled.

An output signal of the reception processing section is supplied to the demultiplexer 4. The demultiplexer 4 separates video packets and audio packets from the input stream. Further, the demultiplexer 4 separates data such as EPG (Electrical Program Guide) data and caption data from the stream. The separated data are supplied to the system controller 11 via the bus 19.

The demultiplexer 4 separates video packets, audio packets, data packets, and PSI (Program Specific Information) and SI (Service Information) packets of a desired program on the basis of a packet identifier (PID) described in a beta section of the packet. In the SI, a variety of information is transmitted such as information on the channel, title, start date and time, broadcast duration time, detailed content, progress status, genre, and series of the program. The EPG data are acquired by reading out the SI.

The video packets from the demultiplexer 4 are decoded in the video decoder 5, and the video data are obtained. The audio packets from the demultiplexer 4 are decoded in the audio decoder 6, and the audio data are obtained. The video data and the audio data are supplied to the feature amount detection section 7.

In the feature amount detection section 7, CM detection is performed. That is, delimitation of a program main part and a CM is detected. Further, when a plurality of CMs is continuous, start points and end points of each CM are detected by detection of silent intervals, detection of black level intervals and the like. Further, since the time length of a CM interval is a multiple of 15 seconds such as 15 seconds, 30 seconds, 45 seconds, and 60 seconds, whether the time length of the detected silent interval or the black level interval is a multiple of 15 seconds is also used for detection of the CM interval. Parameters for detecting the CM are received in accordance with input instructions from the input device by the system controller 11, and are set to ones corresponding to a service to be recorded. Caption data are also used for detecting the CM. Detection of scene change, detection of a person, detection of flesh color, detection of talk, detection of music, detection of a climax and the like may be used as a feature amount other than the CM.

The presentation processing circuit 8 adds a presentation picture presented to a user as necessary at the time of execution of each process, for example, a menu picture, a program lineup, a list of prerecorded programs displayed at the time of the reproducing operation and the like, to a video signal passing through the feature amount detection section 7. The video signal processed by the presentation processing circuit 8 is supplied to the recording and reproducing device and is recorded on the recording medium. The video signal reproduced by the recording and reproducing device is supplied to the display device 9, and video by the video signal is displayed.

On the other hand, the audio packets separated by the demultiplexer 4 are supplied to the audio decoder 6. In the audio decoder 6, an audio signal is decoded from the audio packets supplied from the demultiplexer 4. The audio signal decoded by the audio decoder 6 is supplied to the recording and reproducing device and is recorded on the recording medium. The audio signal reproduced by the recording and reproducing device is supplied to a voice output device such as a speaker which is not shown, and the voice by the audio signal is reproduced.

Further, as a recording and reproducing section, a hard disk 16 and a DVD (Digital Versatile Disc) drive 17 are connected to the system controller 11 via the bus. Content data are recorded in the recording and reproducing section via the system controller 11. The content data reproduced by the recording and reproducing section are supplied to the display device 9 via the system controller 11 and the presentation processing circuit 8, and are displayed on the display device 9. For example, when a stream is recorded on the hard disk 16, the stream is supplied from the reception processing section 3 via the system controller 11 to the hard disk 16, and the stream is recorded on the hard disk 16 as recorded content.

When the stream is recorded on the DVD, the stream is supplied from the reception processing section 3 via the system controller 11 to the DVD drive 17, and the stream is recorded on the DVD as recorded content.

At the time of the reproducing operation, the stream recorded on the recording medium of the recording section as recorded content is read out, and the read out stream is supplied to the demultiplexer 4 via the system controller 11. For example, when the stream recorded on the hard disk 16 is reproduced, the stream is read out from the hard disk 16, and the read out stream is supplied to the demultiplexer 6 via the system controller 11. In addition, when the stream recorded on the DVD is reproduced, the stream is read out from the DVD by the DVD drive 18, and the read out stream is supplied to the demultiplexer 6 via the controller 11.

The hard disk 16 and the DVD drive 17 which constitute the recording section are, respectively, controlled on the basis of a control signal supplied from the system controller 11. Meanwhile, although the recording section is constituted by the hard disk 16 and the DVD drive 17 in this example, the type and the number of the recording mediums constituting the recording section are not particularly limited, if they are suitable for recording and reproducing a stream. For example, the DVD drive 17 may be a drive for recording and reproducing a stream on a Blu-ray Disc (registered trademark).

Data other than video data and audio data extracted by the demultiplexer 4 are supplied to the hard disk 16 via the system controller 11, and are recorded on the hard disk 16. For example, EPG data are recorded on the hard disk 16 as program information. The program information is information on a program including information and the like on the title of a program, genre, channel, broadcast start date and time and broadcast end date and time, detailed content, and a series associated therewith for each program. The recorded content recorded in the hard disk 16 is recorded associated with program information of a corresponding program by, for example, a file name. The program information is used in management of the recorded content, preparation of a program lineup, and a programmed recording function and a reproduction function described later, and the like.

Further, caption data separated by the demultiplexer 4 are supplied to the system controller 11. There may be a case where a caption service is prepared as a standard service in television broadcasting, for example, digital broadcasting. Similarly to the caption, there exists character superimposition as a type for superimposing and displaying characters or figures on the video. In digital broadcasting, dialogue to be displayed in synchronization with a program such as the spoken lines of a drama is called "caption", and dialogue to be broadcasted with no direct relation to a program is called "character superimposition".

Further, as a way of transmitting a caption or character superimposition, there exists an open caption way of transmitting the video in which characters are inserted by a broadcasting station, and a closed caption way of transmitting the video and the characters separately by the broadcasting station and synthesizing them in a receiving side. The caption and the character superimposition of the closed caption way can be extracted in the demultiplexer 4. The caption and the character superimposition of the open caption way can be detected in the feature amount detection section 7.

In order to receive a desired service of digital broadcasting, a user performs a tuning input operation using a remote commander 12, or through the operation buttons. Information of the operation is supplied to the system controller 11. The system controller 11 supplies tuning control information for selecting the broadcast channels in response to the tuning operation of the user to the tuner 2. At the time of the tuning, since the system controller 11 performs display of the broadcast channels during the tuning on the display device 9, the user performs the tuning operation while viewing display of the display device 9.

The tuner 2 and the reception processing section 3 receives the tuning control information, and then selectively extracts the broadcast program of the broadcast channel tuned by the user from television airwaves received by the antenna. A video signal and an audio signal of the selectively extracted broadcast program are decoded by the video decoder 5 and the audio decoder 6. The obtained video signal and the audio signal of the program are reproduced by the display device 9 and the speaker. Further, content data of the program are recorded in, for example, the hard disk 16.

In the recording and reproducing device of FIG. 1, the feature amount detected by the feature amount detection section 9 is supplied to the system controller 11, and the system controller 11 detects delimitation of scenes on the basis of the feature amount. As the delimitation of scenes, detected are a start point and an end point of an interval of program advertising within the program main part, a start point or an end point of an interval of program opening or program ending, a point where a scene in the program main part changes greatly, start points of a plurality of continuous CMs, an end point, and the like. Detection data of the delimitation of scenes are represented by, for example, time information (time stamp). Further, program information of the received broadcast program is also detected as the feature amount, and may be used for detection of a changing point of a scene.

Data of the detected delimitation of scenes are held in the RAM 15. The system controller 11 detects delimitation of chapters by using data of the delimitation of scenes, and generates chapter marks. The generated chapter marks are recorded in the database 18 by the system controller 11. The chapter marks are recorded in the database 18 in association with video data and voice data of the broadcast program to be recorded. As described below, the embodiment of the invention is to solve a problem in the case where the delimitation of scenes is detected by using the caption and the CM, therefore description will be omitted of a method of detecting the delimitation of scenes by using the feature amount other than the CM and the caption.

An Example of Digital Broadcasting

Figure 2:
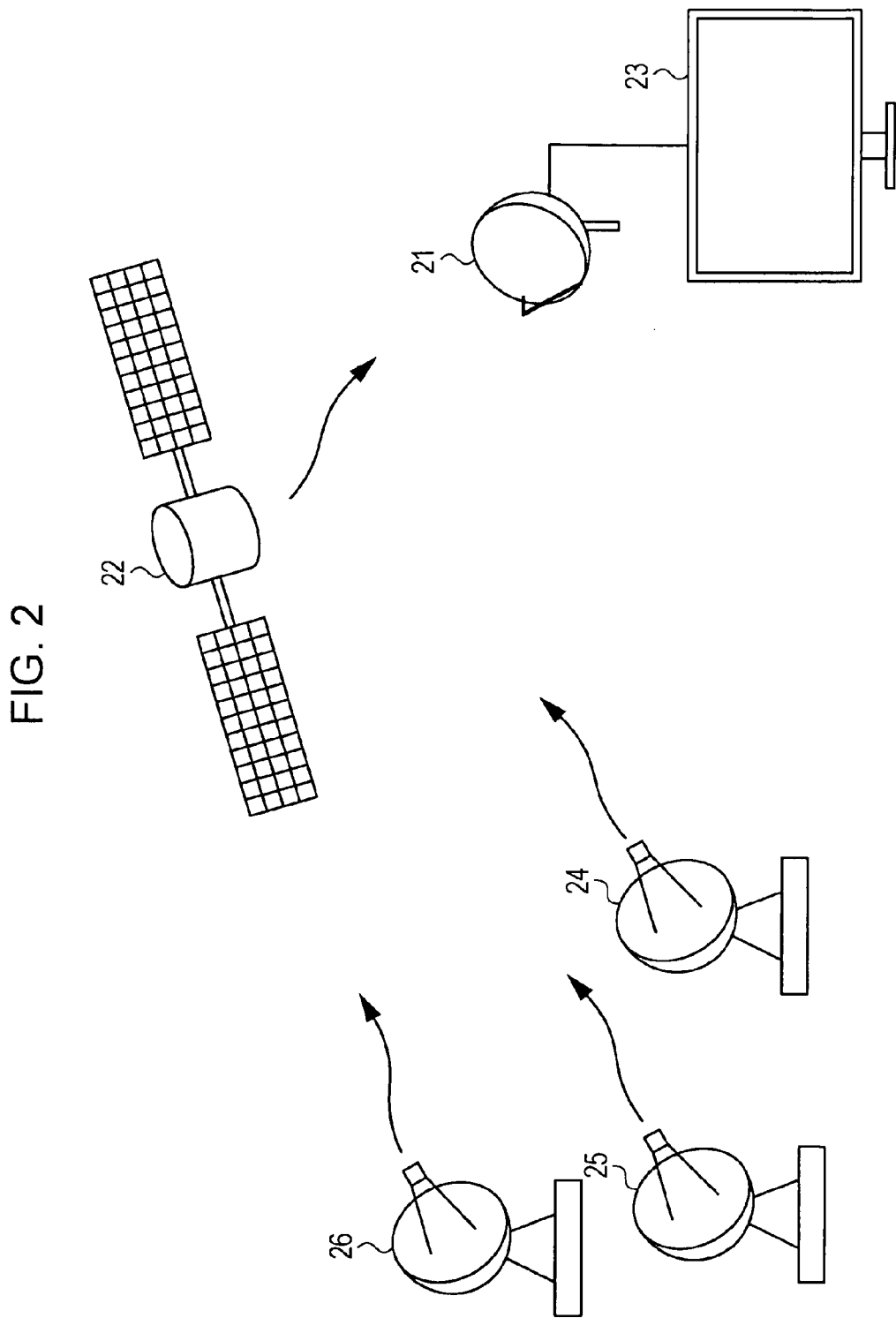
FIG. 2 is a schematic diagram used for describing digital satellite broadcasting to which the first embodiment of the invention is applied.

An example of digital broadcasting to be received in accordance with an embodiment of the invention will be described. As shown in FIG. 2, the embodiment is configured to receive satellite digital broadcasting in Europe. In Europe, the development is realized with respect to each media of satellite, ground, and cable television by community DVB (Digital Video Broadcasting), and DVB specifications are formulated. In the case of digital satellite broadcasting, it is possible to receive digital satellite broadcasting through a receiver 23 by installing a receiving antenna 21 in a direction of a broadcasting satellite 22.

It is possible to receive broadcasting from broadcasting stations 25, 26, . . . , and the like of other countries other than a domestic broadcasting station 24 in a broadcasting station. As an example, when the receiving antenna 21 and the like is installed so as to receive broadcasting from a main broadcasting satellite in Germany, it is possible to receive broadcasting of the Middle East and South America, as well as broadcasting of Europe such as Spain, Italy, and France. The number of receivable channels is extremely large, in the order of thousands.

As shown in a hierarchical structure of FIG. 3, in digital broadcasting in Europe, a satellite 31, a cable 32, and a ground station 33 are envisaged as a highest layer (network). A plurality of transponders $34_1, 34_2, \ldots, 34n$ exists as a lower layer of the satellite 31. A plurality of services $35_1, 35_2, \ldots, 35m$ exists as a lower layer of the transponders $34_1$ to $34n$. One or more services are multiplexed in one transponder. Video data 36, audio data 37a and 37b, and data 38 are included in one service as components.

A plurality of channels $41_1, 41_2, \ldots, 41p$ exists as a lower layer of the cable 32. A plurality of services $42_1, 42_2, \ldots, 42q$ exists as a lower layer of the channels $41_1$ to $41p$. Components, which are not shown, exist in one service, respectively. A plurality of channels $43_1, 43_2, \ldots, 43r$ exists as a lower layer of the ground station 33. A plurality of service $44_1, 44_2, \ldots, 44s$ exists as a lower layer of the channels $43_1$ to $43r$. Components, which are not shown, exist in one service, respectively.

In such digital broadcasting, the services to be received through, for example, digital satellite broadcasting are specified on the basis of IDs of each layer. An ID for identifying a network is originalnetworkid. An ID for identifying a transport stream is transportstreamid. In addition, an ID for identifying a service is serviceid. An operation for selecting a desired broadcasting station is an operation for setting these IDs to specific ones.

The manner of insertion of the CM is different among broadcasts of a plurality of countries. FIG. 4A is a broadcast in which the CMs are inserted into a main part for a relatively short period of time. Therefore, double the CMs are inserted with respect to the same main part X. FIG. 4B is an example in which the CM having a relatively long time is inserted at the timing of switching a main part X and a main part Y. A form of FIG. 4B is adopted by a portion of the public broadcast. Further, in the public broadcast, the CM is not inserted at all, and only the programs are switched, as shown in FIG. 4C.

As described above, as a method of inserting the CM, when one kind of method of detecting the CM is applied under conditions in which various patterns exist, there occurs a problem that detection of the CM is mistaken. For example, when the time period of the CM is a multiple of 15 seconds, and is specified to a maximum of two minutes, there occurs a problem that detection of the CM having a length exceeding two minutes is mistaken, as shown in FIG. 4B. As a result, in an example where a chapter mark is given to delimitation of the main part and the CM, chapter detection is mistaken. Further, in the case of the example shown in FIG. 4C, the CM detection is not performed, and the chapter mark may not be added to delimitation of the main parts X and Y.

It is considered to use information of the caption in order to detect the CM. For example, in the programs of the Netherlands, in the case of foreign movies, captions in Dutch language are given with original language with respect to the voice. On the other hand, since the part of the CM is Dutch language the captions are not given. Therefore, it is possible to detect the CM with high accuracy by the existence of the captions. In the German programs, since foreign movies are mostly dubbed, the captions are not given. In this case, it is difficult to employ the existence of the captions for detection of the CM. In this manner, when methods of inserting the CM are different in accordance with countries and regions, it is difficult to raise accuracy of the CM detection, if a pattern (parameter) for performing chapter detection is not switched.

Use of Captions, Video Pattern and Voice Pattern in Scene Detection

As described above, even when the manner of insertion of the CM is different in accordance with regions and services, the embodiment of the invention can perform the CM detection correctly. FIG. 5 is a diagram in which methods of using captions, a video pattern, and a voice pattern in the scene detection, and differences in accordance with regions and services are collected with a table. The chapter is given by using a result of the scene detection.

It is possible to use the captions in the scene detection. That is, it is possible to discriminate the main part and the CM by using the fact that "foreign language translation captions do not exist during the CM". In the Netherlands, in the case of the foreign language, captions are given in the Dutch language. In Germany, a German-speaking voice is given in dubbing, and captions are not given.

It is possible to use a video pattern in the scene detection. That is, when a scene is analyzed by detecting a cut on the basis of the video pattern, the case where the cuts for a given time are continuous is determined to be the CM. In the public broadcast, the CM does not exist, or the CM for a relatively long period of time is inserted outside the main part. In the private broadcast, the CM for a short period of time exists in the same program.

It is possible to use a voice pattern in the scene detection. That is, when a scene is analyzed by detecting a cut on the basis of the voice pattern, the case where the cuts for a given time are continuous are determined to be the CM. In the public broadcast, the CM does not exist, or the CM for a relatively long period of time is inserted into a layer outside the main part. In the case of the private broadcast, the CM for a short period of time exists in the same program.

Scene Detecting Method

Figure 6:
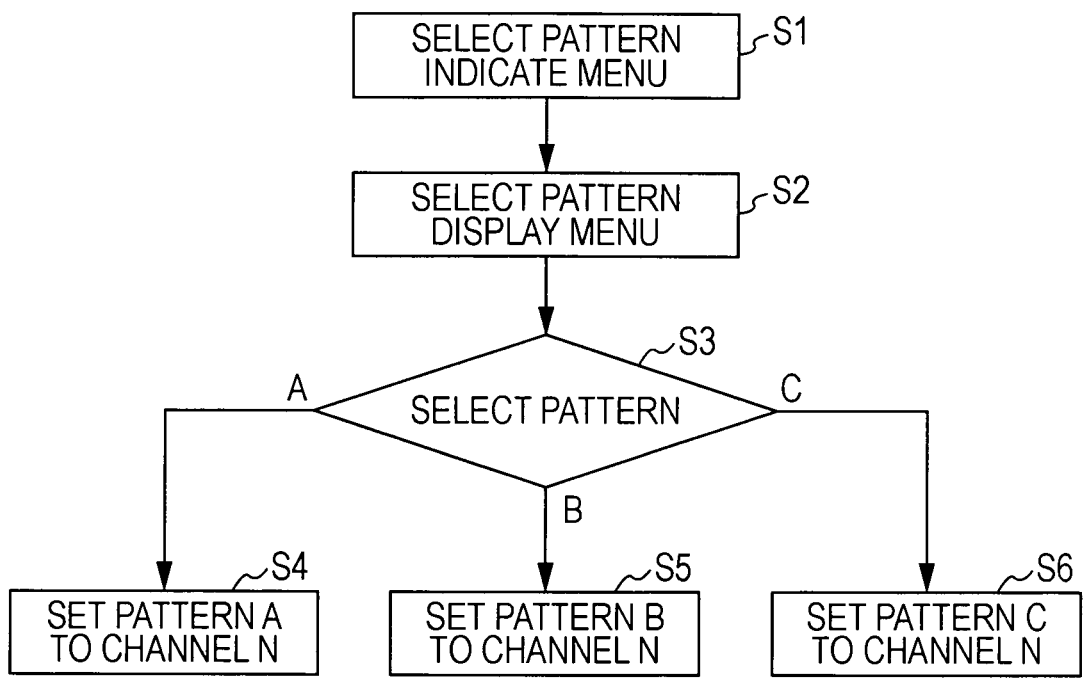
FIG. 6 is a flowchart used for describing the first embodiment of the invention.
Figure 7:
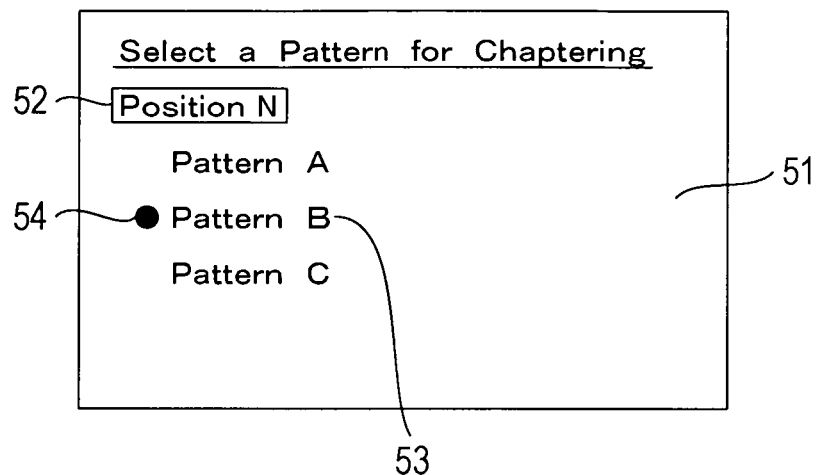
FIG. 7 is a schematic diagram illustrating an example of a user interface screen in the first embodiment of the invention.

A user sets a pattern of scene detection suitable for a received service by operating a remote controller 12. FIG. 6 shows a flow of a process at the time of pattern setting. To begin with, in a state where a certain service (channel N) is received, a pattern selection menu is indicated by an operation of a user (step S1). A pattern selection menu as shown in FIG. 7 is displayed on the display device 9 (step S2).

A display 52 of a service (tuning position) being tuned currently, and a display 53 of a selectable pattern are displayed in the pattern selection menu 51. In an example of FIG.

7, three types of patterns A, B and C can be selected, respectively. In step S3, a user operates the input device such as the remote controller 12 to select a desired pattern. For example, a cursor 54 is fitted into a position of the desired pattern to operate a determination key, thereby allowing the desired pattern to be set. Selection of the pattern is made on the basis of information (for example, information on the country of sending-out origination, whether or not the broadcast is public, and the like) on a service, known by a user, which is being received. Alternatively, for example, a correspondence table of the services to be received and the patterns is described in an instruction manual, and a user may perform the selection in accordance with the correspondence table.

The patterns A, B and C correspond to the method of scene detection as described above. For example, the pattern A is a parameter optimal for detecting the CM from a broadcast in which the CM is inserted into the main part for a relatively short period of time as shown in FIG. 4A. The pattern B is a parameter optimal for detecting the CM from a broadcast in which the CM for a relatively long time is inserted at the timing of switching the main part X and the main part Y as shown in FIG. 4B. The pattern C is a parameter optimal for detecting the CM from a broadcast (public broadcast) in which the CM as shown in FIG. 4C is not inserted at all, and only a program is switched.

The patterns of these scene detecting methods are executed by a program stored in the ROM 14 or the database 18. The system controller 11 applies the scene detecting method of the selected pattern (parameter) with respect to a detection result obtained in the feature amount detection section 7.

In step S3, when the pattern A is selected, the pattern A is applied with respect to the channel (service) N (step S4). In step S3, when the pattern B is selected, the pattern B is applied with respect to the channel (service) N (step S5). In step S3, when the pattern C is selected, the pattern C is applied with respect to the channel (service) N (step S6). The correspondence relationship of the selected pattern and the service is registered in the database 18. After the registration, when the channel N is received, the selected pattern is automatically applied with respect to the channel N. Of course, similarly to the description as mentioned above, by displaying the pattern selection menu, the pattern may be selected once again.

Second Embodiment

Scene Detecting Method

A second embodiment of the invention is different from the above-mentioned first embodiment of the invention in the scene detecting method. The other configurations and operations are the same as the first embodiment. That is, the configuration of the recording and reproducing device shown in FIG. 1, the digital broadcasting shown in FIG. 2 and FIG. 3, and the like are applied with respect to the second embodiment. Therefore, hereinafter, a scene detecting method in the second embodiment will be described, and other description will be omitted.

The correspondence relationship of the service to be received and the parameter of the scene detecting method to be applied is stored in advance on the database 18. The database is prepared in a factory. Otherwise, a table of the correspondence relationship of the service and the parameter is downloaded from a server on the network.

Figure 8:
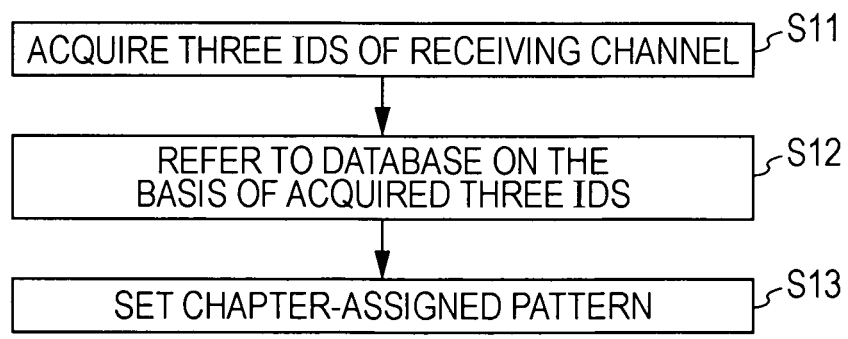
FIG. 8 is a flowchart used for describing the first embodiment of the invention.

In step S11 of FIG. 8, the system controller 11 acquires three IDs of a receiving service (receiving channel) from data separated by the demultiplexer 4. As described above, originalnetworkid, transportstreamid, and serviceid are acquired.

The system controller 11 specifies the service to be received by three IDs. In step S12, the database 18 is referred to on the basis of the acquired three IDs. The parameter for a service to be received is perceived by the database 18. In S13, a chapter-assigned pattern perceived by the database 18 is set.

When the database 18 is previously prepared, the second embodiment of the invention is able to automatically set the chapter-assigned pattern (parameter) to an optimal pattern in the case where a certain service is received.

Modified Example

The present invention is not limited to the above-mentioned embodiments, but various types of modifications are possible based on the technical idea of the invention. For example, although the above-mentioned description is an example in which the present invention is applied to assign the chapter as delimitation of the content, the present invention is able to perform the detection similarly even with respect to the scene detection of the CM and the like. Further, the present invention is able to be applied even with respect to the case where a cable television and an IPTV service are received other than by digital satellite broadcasting.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus comprising:
one or more processors operable to:
set a parameter of a delimitation detecting method with respect to one of a plurality of broadcast services that receives audiovisual content,
wherein the parameter is set for feature detection based on user selection of one of a plurality of predefined temporal patterns of switching between one or more intervals and one or more programs in the received audiovisual content,
wherein each of the plurality of predefined temporal patterns corresponds to one or more of the plurality of broadcast services; and
detect delimitation of the received audiovisual content based on the set parameter.

2. An information processing apparatus comprising:
one or more processors operable to:
specify one of a plurality of broadcast services that receives audiovisual content;
set a parameter of a delimitation detecting method with respect to the specified broadcast service,
wherein the parameter is set for feature detection based on user selection of one of a plurality of predefined temporal patterns of switching between one or more intervals and one or more programs in the received audiovisual content,
wherein each of the plurality of predefined temporal patterns corresponds to one or more of the plurality of broadcast services; and
detect delimitation of the received audiovisual content based on the set parameter.

3. The information processing apparatus according to claim 2, wherein the one or more intervals correspond to one or more commercial messages in the received audiovisual content, wherein the one or more commercial messages are detected by the delimitation detecting method, and the delimitation of the audiovisual content is detected by the detected one or more commercial messages.

4. The information processing apparatus according to claim 2, wherein a caption in the received audiovisual content is detected by the delimitation detecting method, and the delimitation of the audiovisual content is detected by the detected caption.

5. The information processing apparatus according to claim 2, wherein the received audiovisual content and the detected delimitation are recorded on a recording medium.

6. The information processing apparatus according to claim 2, wherein the one of the plurality of broadcast services is a received channel among a plurality of channels.

7. An information processing method comprising:
setting a parameter of a delimitation detecting method with respect to one of a plurality of broadcast services that receives audiovisual content by an operation of an input device,
wherein the parameter is set for feature detection based on the operation of the input device to select one of a plurality of predefined temporal patterns of switching between one or more intervals and one or more programs in the received audiovisual content,
wherein each of the plurality of predefined temporal patterns corresponds to one or more of the plurality of broadcast services; and
detecting delimitation of the received audiovisual content based on the set parameter.

8. An information processing method comprising:
specifying one of a plurality of broadcast services that receives audiovisual content;
setting a parameter of a delimitation detecting method with respect to the specified broadcast service,
wherein the parameter is set for feature detection based on user selection of one of a plurality of predefined temporal patterns of switching between one or more intervals and one or more programs in the received audiovisual content,
wherein each of the plurality of predefined temporal patterns corresponds to one or more of the plurality of broadcast services; and
detecting delimitation of the received audiovisual content based on the set parameter.

9. The information processing method according to claim 8, wherein the one of the plurality of broadcast services is a received channel among a plurality of channels.

10. An information processing apparatus comprising:
a parameter setting section operable to set a parameter of a delimitation detecting method with respect to one of a plurality of broadcast services that receives audiovisual content by an operation of an input device,
wherein the parameter is set for feature detection based on the operation of the input device to select one of a plurality of predefined temporal patterns of switching between one or more intervals and one or more programs in the received audiovisual content,
wherein each of the plurality of predefined temporal patterns corresponds to one or more of the plurality of broadcast services; and
a delimitation detecting section operable to detect delimitation of the received audiovisual content based on the set parameter.

11. An information processing apparatus comprising:
a service specifying section operable to specify one of a plurality of broadcast services that receives audiovisual content;
a parameter setting section operable to set a parameter of a delimitation detecting method with respect to the specified broadcast service by an operation of an input device,
wherein the parameter is set for feature detection based on the operation of the input device to select one of a plurality of predefined temporal patterns of switching between one or more intervals and one or more programs in the received audiovisual content,
wherein each of the plurality of predefined temporal patterns corresponds to one or more of the plurality of broadcast services; and
a delimitation detecting section operable to detect delimitation of the received audiovisual content based on the set parameter.

12. The information processing apparatus according to claim 1, wherein the one or more intervals correspond to one or more commercial messages in the received audiovisual content, wherein the one or more commercial messages are detected by the delimitation detecting method, and the delimitation of the audiovisual content is detected by the detected one or more commercial messages.

13. The information processing apparatus according to 1, wherein a caption in the received audiovisual content is detected by the delimitation detecting method, and the delimitation of the audiovisual content is detected by the detected caption.

14. The information processing apparatus according to claim 1, wherein the received audiovisual content and the detected delimitation are recorded on a recording medium.

15. The information processing apparatus according to claim 1, wherein the one of the plurality of broadcast services is a received channel among a plurality of channels.

16. The information processing apparatus according to claim 1, wherein the plurality of predefined temporal patterns of switching comprises:
an insertion of one or more commercial messages into the audiovisual content for short periods of time;
an insertion of the one or more commercial messages into the audiovisual content for long periods of time; and
a switching of the audiovisual content without the insertion of the one or more commercial messages into the audiovisual content.

17. The information processing apparatus according to claim 1, further comprising a database to store a correspondence between the plurality of broadcast services and the plurality of predefined temporal patterns.

18. The information processing apparatus according to claim 1, wherein the parameter is set based on one or more of: a network identifier (ID), a transport stream ID and a service ID.

* * * * *